(12) United States Patent
Heinrich

(10) Patent No.: US 7,278,523 B2
(45) Date of Patent: Oct. 9, 2007

(54) DUAL CLUTCH TRANSMISSION WITH AXIALLY PARALLEL CLUTCHES HAVING AN IMPROVED BACKING PLATE ASSEMBLY

(75) Inventor: Johannes Heinrich, Friedrichsdorf (DE)

(73) Assignee: BorgWarner Inc., Auburn Hills, MI (US)

( * ) Notice: Subject to any disclaimer, the term of this patent is extended or adjusted under 35 U.S.C. 154(b) by 281 days.

(21) Appl. No.: 11/105,077

(22) Filed: Apr. 13, 2005

(65) Prior Publication Data
US 2005/0279606 A1    Dec. 22, 2005

(30) Foreign Application Priority Data
Jun. 17, 2004  (EP) .................... 04014167

(51) Int. Cl.
*F16D 25/10* (2006.01)

(52) U.S. Cl. ............. 192/48.8; 192/70.2; 192/109 R; 192/112

(58) Field of Classification Search ............ None
See application file for complete search history.

(56) References Cited

U.S. PATENT DOCUMENTS

| | | | |
|---|---|---|---|
| 3,040,408 A | | 6/1962 | Sehou ..................... 74/377 |
| 3,313,385 A | * | 4/1967 | Forster ................... 192/70.2 |
| 3,362,481 A | | 1/1968 | Steinhagen ............. 192/85 |
| 2004/0206599 A1 | | 10/2004 | Hegerath ............... 192/87.11 |

FOREIGN PATENT DOCUMENTS

| | | |
|---|---|---|
| DE | 1 146 314 | 3/1963 |
| EP | 1 195 537 A1 | 10/2002 |

\* cited by examiner

*Primary Examiner*—Saul Rodriguez
(74) *Attorney, Agent, or Firm*—Bliss McGlynn, P.C.

(57) ABSTRACT

A dual clutch transmission with an axially parallel clutches that includes a disc support having a first circumferential groove, a backing plate having a corresponding second circumferential groove, and an annular spring element adapted to concurrently fit within the first circumferential groove and the second circumferential groove to cause the backing plate to be axially immobilized with respect to the disc support.

8 Claims, 3 Drawing Sheets

DUAL CLUTCH TRANSMISSION WITH AXIALLY PARALLEL CLUTCHES HAVING AN IMPROVED BACKING PLATE ASSEMBLY

BACKGROUND OF THE INVENTION

1. Field of the Invention

The present invention relates, generally to a dual clutch transmission and, more specifically, to a dual clutch transmission with axially parallel clutches having an improved backing plate assembly.

2. Description of the Related Art

In the art of providing motive power to motor vehicles, power shifting transmissions have evolved as the latest approach to automatically transferring power from the prime mover, or engine, to the driven wheels. Power shifting transmissions can take the form of a dual, or twin, clutch transmission where the torque input from the engine is delivered to two input shafts each supporting a portion of the gear sets. Each input shaft has an associated clutch to selectively transfer torque provided by the engine. Since the input engine torque comes through a single input member, such as the flywheel or crankshaft, the two clutch assemblies are typically structured in a dual co-axial assembly having an axially parallel arrangement. The dual clutch assembly is operatively disposed about the two input shafts, which are also in a co-axial and co-centric arrangement.

To selectively engage and disengage their respective input shafts, the two clutches of the dual clutch transmission are each comprised of a set of clutch discs, also referred to as a clutch pack. The clutch packs each include one set of discs physically coupled to one of the input shafts and another set of discs physically coupled to the torque input member. The clutches are engaged by compressing the two sets of discs together against a fixed back plate. Conventional dual clutch art provides that the two clutch packs are juxtaposed to each other about a dual co-axial input shaft assembly so that when either of the clutch packs are compressed, they are pressed from either axial end against a common end or back plate that is disposed between them. The end plate is also referred to as a "backing plate." The two sets of clutch discs in each clutch pack are alternately supported by inner and outer disc supports. To provide efficient construction of the dual clutch assembly, the two clutch packs have a common disc support that is operatively coupled to the torque input. The common disc support may be either the inner or the outer disc support depending upon the overall design. The disc supports may be shafts, bushings, or the like. Regardless, the backing plate is axially fixed to the common disc support to provide a solid immovable plate to compress the discs of each of the clutch pack against.

There are a number of conventional approaches to providing a backing plate between the two clutch packs. One known approach provides a common inner disc support that includes a radially extending flange, which is integral to the disc support and serves as a backing plate. This one-piece type of backing plate construction provides a common backing plate for each clutch pack, but is expensive to produce.

Other approaches to backing plate structure for dual clutch assemblies provide that the backing plate does not have to be integrally formed with the inner disc support, but can also be a separate piece or pieces that are rigidly connected to the inner disc support by axially fixing them to the inner disc support. For example, in an attempt to provide certain cost-effective solutions, some prior art approaches employ two backing plates that are fixed to the inner disc support with one or more snap rings. As shown in FIG. 2, one prior art approach shows a dual clutch assembly 50 with an axially parallel design with two backing plates 60 and 61 each fixed to an inner disc 55 support by snap rings 62 and 63, respectively. The snap rings 62, 63 attach each backing plate 60, 61 axially in one direction. The axial compressive forces that engage the right side clutch pack 52 are supported against both backing plates 60, 61. The axial compressive forces that engage the left clutch pack 51 are only supported by the left backing plate 60 against the right snap ring 63. The right backing plate 61 and the left snap ring 62 are unstressed in this case. In FIG. 3, another prior art approach shows a dual clutch assembly 70, similar to that shown in FIG. 2, wherein two backing plates 71 and 72 are supported against a single snap ring 73 disposed equally between the plates 71, 72.

While providing certain advantages over the solid flange backing plate construction previously mentioned, the prior art structure illustrated in FIGS. 2 and 3 also have disadvantages and drawbacks. The prior art backing plate approaches shown in FIGS. 2 and 3 require two separate backing plates, which must be mounted from both sides of the inner disc support and that have twice the mass and inertia of a single backing plate design. Thus, the two backing plate approach adds cost to the assembly process and adds inefficient parasitic losses from their weight.

Further, due to the prior art placement of the snap rings in either of these designs, the backing plates are not supported across their base surface at the inner disc support resulting in relatively low rigidity. Thus, in the prior art, when either clutch pack in engaged, the respective backing plate deforms radially and presses against the opposing backing plate. This radial deformation of the backing plates cause the clutch discs, which lie close to the backing plates, to wear very unevenly. Resulting in inaccuracy and inefficiency in the engagement of the clutches, poor clutch and transmission performance, and early failure of the clutch packs.

Accordingly, there remains a need in the related art for a backing plate assembly for an axially parallel dual clutch arrangement that is cost efficient to manufacture, simple to install, and has a high rigidity.

SUMMARY OF THE INVENTION

The disadvantages of the related art are overcome by the present invention of a dual clutch transmission with an axially parallel clutches that includes a disc support having a first circumferential groove, a backing plate having a corresponding second circumferential groove, and an annular spring element adapted to concurrently fit within the first circumferential groove and the second circumferential groove to cause the backing plate to be axially immobilized with respect to the disc support. In this manner, the axially parallel dual clutch arrangement of the present invention includes a single backing plate that provides the advantages by simplifying both the manufacturing and assembly processes while providing a backing plate that has a high rigidity that will not deflect and cause wear and premature failure.

Other objects, features and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
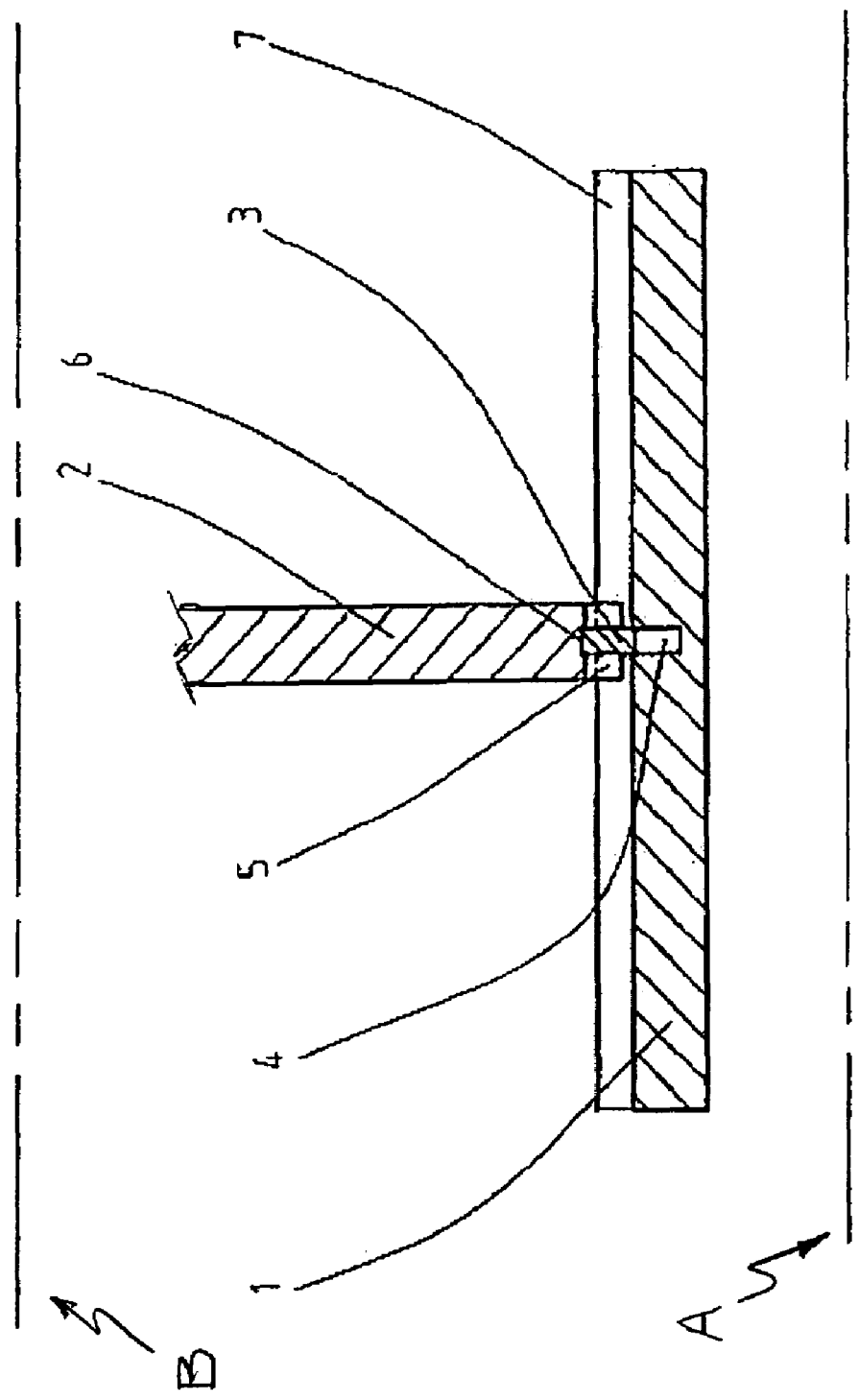
FIG. 1 is a partial cross-section view of the backing plate assembly of the present invention.

The backing plate assembly for the axially parallel clutches of a dual clutch transmission in accordance with the present invention is generally indicated at 10 in FIG. 1. The backing plate assembly 10 may be employed in the dual clutch transmission illustrated in FIGS. 2 and 3. The backing plate assembly 10 includes a disc support 1 having a first circumferential groove 4, a backing plate 2 that includes a corresponding second circumferential groove 6, and an annular spring element 3 adapted to concomitantly fit within the first circumferential groove 4 and the second circumferential groove 6 to cause the backing plate 2 to be axially immobilized with respect to the disc support 1.

It should be appreciated by those of ordinary skill in the art that the partial cross-sectional view of FIG. 1 provides that the disc support 1 may be either an inner disc support having an axis as generally indicated at "A" in FIG. 1, or may be an outer disc support having an axis as generally indicated at "B". If the disc support 1 is an inner disc support, the first circumferential groove is disposed in its outer circumference, and the backing plate 2 has an open inner diameter with the second circumferential groove 6 disposed in its inner circumference. In this case, the backing plate 2 is adapted to slidingly fit over the inner disc support 1 such that the annular spring element 3 is disposed within both the first and said second circumferential grooves 4 and 6.

It should be appreciated that the annular spring member 3 may be any of a variety of compressible circular shaped rings, such as those commonly known as snap rings, for example. Thus, when assembled, annular spring element 3 is supported on the outer perimeter against the groove floors of the groove 6 in the backing plate 2. In this manner, the backing plate 2 is axially fixed on the inner disc support 1. It may be desirous to provide additional torsional moment force through the backing plate 2 to the inner disc support 1 when the clutch packs are engaged. In this case, backing plate 2 may also radially immobilized with respect to the inner disc support 1 by an additional mounting interaction such as teeth, or splines, as represented by numbers 5 and 7.

To assemble the backing plate 2 to the inner disc support 1 as illustrated, the annular spring element 3 is pushed over the inner disc support 1. The size of the annular spring element 3 is predetermined based on the diameter of the inner disc support so that when the annular spring element 3 is placed over the inner disc support 1 it exerts a low spring tension against the outer perimeter of the inner disc support 1. In this manner, when the annular spring element 3 is slid along the inner disc support 1 it springs into the first circumferential groove 4 and is thereby fixed in the axial direction.

After this, the annular spring element 3 is pushed further into the groove 4 by means of an external force that circumferentially presses against the annular spring element 3 for assembly purposes. The first circumferential groove 4 of the inner disc support 1 has a depth sufficient to allow the annular spring element 3 to be compressed below the surface of the inner disc support 1 to allow the backing plate 2 to be operatively slid over the compressed annular spring element 3 to allow the first and second circumferential grooves 4, 6 to be axially aligned. When the circumferential grooves 4 and 6 align, the annular spring element 3 springs open so that it secures the backing plate 2 to the inner disc support 1 in an undetachable manner. During transmission operation, the inherent centrifugal force supports this effect.

In order to prevent the backing plate 2 from moving axially when the annular spring element 3 expands due to the centrifugal force, the second circumferential groove 6 in the backing plate 2 has a depth such that the annular spring element 3 remains partially in both the first and second circumferential grooves 4 and 6 at its maximum expansion. Normally, the connection between the inner disc support 1 and the backing plate 2 cannot be undone and is comparable to a welded plate as the annular spring element 3 would have to be pushed inside the inner disc support 1 again against its own expanding force. However, it would be possible to provide the backing plate 2 with radial bore holes (not shown) through which the annular spring element 3 can be pushed towards the inside with suitable rods.

The resulting backing plate assembly 10 provides the advantage of the high rigidity, which is proportional to the thickness of the backing plate 2. More specifically, referring to the prior art approach in FIG. 2, one may assume that the rigidity of an individual backing plate 60 or 61 has the reference value "1". Then when clutch pack 51 is compressed to the right, the backing plates 60, 61 can only provide a force value of "1" (left backing plate 60 is supported only against the right snap ring 63, the right backing plate 61 is free). When clutch pack 52 is compressed to the left, the overall rigidity of the backing plates is "2" (right backing plate 61 is supported against the right snap ring 63 and left backing plate 60).

Figure 2:
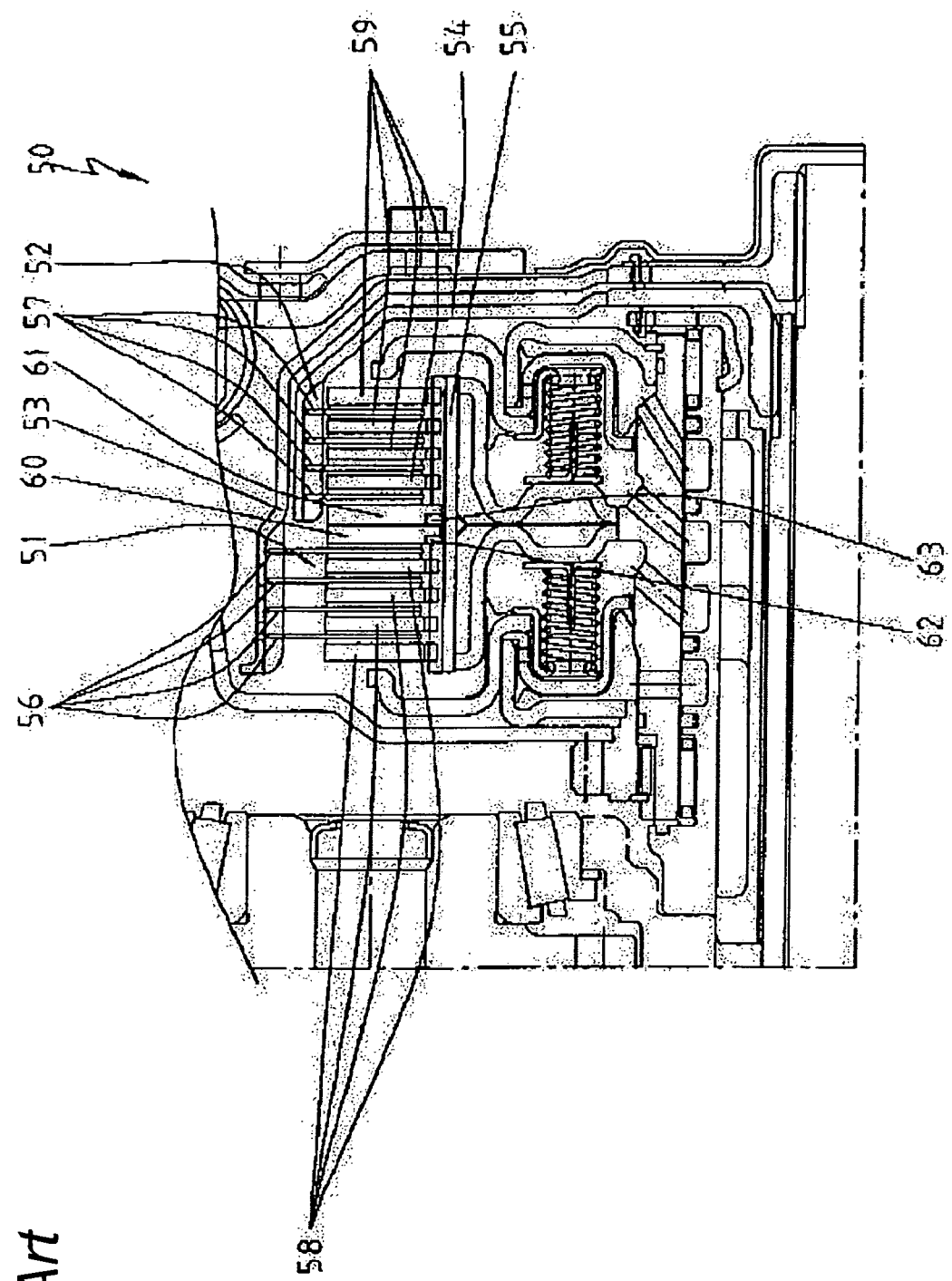
FIG. 2 is a cross-section of one example of a prior art approach to providing a backing plate assembly for a dual clutch assembly.
Figure 3:
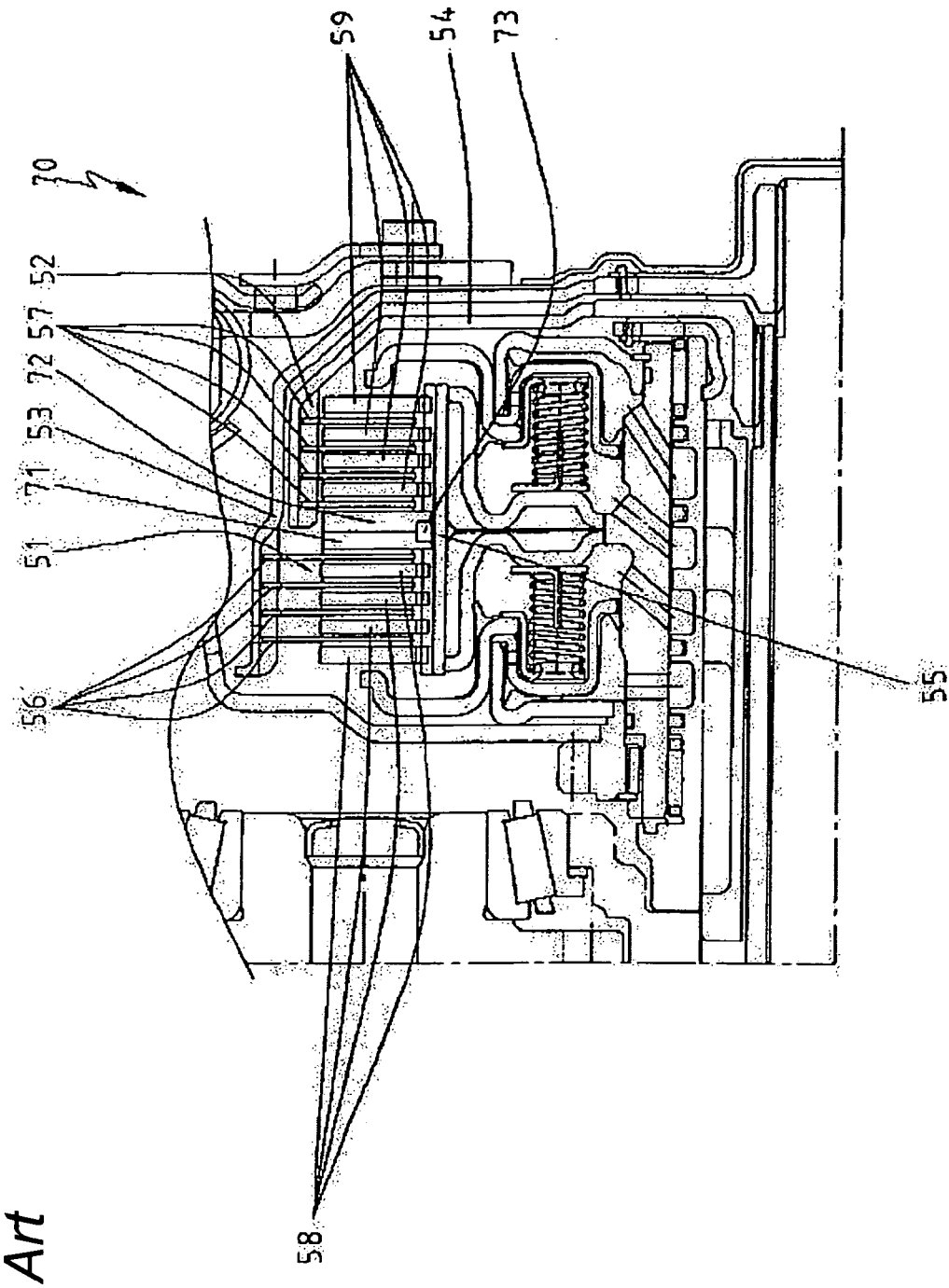
FIG. 3 is a cross-section of another example of a prior art approach to providing a backing plate assembly for a dual clutch assembly.

In contrast, if the backing plate 2 of the present invention as shown in FIG. 1 is employed having a comparable thickness to the two individual plates 60, 61 of the prior art design in FIG. 2, backing plate 2 would distribute the applied force of either clutch pack across its inner diameter to provide a rigidity value of "8". Thus, the backing plate 2 is 4 to 8 times as rigid as the backing plates 60, 61 shown in FIG. 2 at a comparable thickness. Employing a narrower backing plate 2 than the combination of 60 and 61 of the prior art provides the benefit of weight reduction while still increasing the rigidity.

As previously mentioned, FIG. 1 also provides that the disc support 1 may be an outer disc support having an axis as generally indicated at "B". If the disc support 1 is an outer disc support it includes an open inner diameter with the first circumferential groove 4 disposed in its inner circumference and backing plate 2 has the second circumferential groove 6 disposed in its outer circumference. In this case, the backing plate 2 is adapted to slidingly fit within the outer disc support 1 such that the annular spring element 3 is disposed within both the first and said second circumferential grooves 4 and 6.

It may be desirous to provide additional torsional moment force through the backing plate 2 to the outer disc support 1 when the clutch packs are engaged. In this case, backing plate 2 may also radially immobilized with respect to the outer disc support 1 by an additional mounting interaction such as teeth, or splines, as represented by numbers 5 and 7.

To assemble the backing plate 2 to the outer disc support 1, the annular spring element 3 is pushed over the outer diameter of the backing plate 2. The size of the annular spring element 3 is predetermined, based on the diameter of the backing plate 2 so that when the annular spring element 3 is placed over the backing plate 2 it exerts a low spring tension against the outer diameter of the backing plate 2. In this manner, when the annular spring element 3 is slid along the backing plate 2 it springs into the second circumferential groove 6 and is thereby fixed in the axial direction.

After this, the annular spring element 3 is pushed further into the groove 4 by means of an external force that circumferentially presses against the annular spring element 3 for assembly purposes. The second circumferential groove 6 of the backing plate 2 has a depth sufficient to allow the annular spring element 3 to be compressed below the surface of the backing plate 2 to allow the backing plate 2 to be operatively slid backing plate to be operatively slid within the outer disc support 1 to allow the first and second circumferential grooves 4, 6 to be axially aligned. When the circumferential grooves 4 and 6 align, the annular spring element 3 springs open so that it secures the backing plate 2 to the outer disc support 1 in an undetachable manner. During transmission operation, the inherent centrifugal force supports this effect.

In order to prevent the backing plate 2 from moving axially when the annular spring element 3 expands due to the centrifugal force, the first circumferential groove 4 in the outer disc support 1 has a depth such that the annular spring element 3 remains partially in both the first and second circumferential grooves 4 and 6 at its maximum expansion. Normally, the connection between the outer disc support 1 and the backing plate 2 cannot be undone and is comparable to a welded plate as the annular spring element 3 would have to be pushed inside the backing plate 2 again against its own expanding force.

Thus, axially parallel dual clutch arrangement of the present invention employs a single backing plate that provides the advantages of simplifying both the manufacturing and assembly processes while providing a backing plate that has a high rigidity that will not deflect and cause wear and premature failure.

The invention has been described in an illustrative manner. It is to be understood that the terminology, which has been used is intended to be in the nature of words of description rather than of limitation. Many modifications and variations of the invention are possible in light of the above teachings. Therefore, within the scope of the claims, the invention may be practiced other than as specifically described.

I claim:

1. A dual clutch transmission with an axially parallel clutches including:
    a disc support having a first circumferential groove;
    a backing plate having a corresponding second circumferential groove; and
    an annular spring element adapted to concomitantly fit within said first circumferential groove and said second circumferential groove to cause said backing plate to be axially immobilized with respect to said disc support, wherein said disc support is an inner disc support with said first circumferential groove disposed in its outer circumference and wherein said backing plate has an open inner diameter with said second circumferential groove disposed in its inner circumference, said backing plate adapted to slidingly fit over said inner disc support such that said annular spring element is disposed within both said first and said second circumferential grooves.

2. A dual clutch transmission as set forth in claim 1 wherein said first circumferential groove of said inner disc support has a depth sufficient to allow said annular spring element to be compressed below the surface of said inner disc support to allow said backing plate to be operatively slid over said compressed annular spring element to allow said first and said second circumferential grooves to be axially aligned.

3. A dual clutch transmission as set forth in claim 2 wherein said second circumferential groove of said backing plate has a depth such that said annular spring element remains partially in both said first and said second circumferential grooves at its maximum expansion.

4. A dual clutch transmission as set forth in claim 1 wherein said backing plate is also radially immobilized with respect to said inner disc support.

5. A dual clutch transmission as set forth in claim 1 wherein said disc support is an outer disc support having an open inner diameter with said first circumferential groove disposed in its inner circumference and wherein said backing plate has said second circumferential groove disposed in its outer circumference, said backing plate adapted to slidingly fit within said outer disc support such that said annular spring element is disposed within both said first and said second circumferential grooves.

6. A dual clutch transmission as set forth in claim 5 wherein said second circumferential groove of said backing plate has a depth sufficient to allow said annular spring element to be compressed below the surface of said backing plate to allow said backing plate to be operatively slid within said outer disc support to allow said first and said second circumferential grooves to be axially aligned.

7. A dual clutch transmission as set forth in claim 6 wherein said first circumferential groove of said outer disc support has a depth such that said annular spring element remains partially in both said first and said second circumferential grooves at its maximum expansion.

8. A dual clutch transmission as set forth in claim 5 wherein said backing plate is also radially immobilized with respect to said inner disc support.

* * * * *